United States Patent [19]

Besecke et al.

[11] Patent Number: 4,889,909

[45] Date of Patent: Dec. 26, 1989

[54] THERMOPLASTIC POLYARYLENE ETHERS

[75] Inventors: Sigmund Besecke, Seeheim-Jugenheim; Joachim Knebel, Darmstadt; Guenter Schroeder, Ober-Ramstadt; Werner Ude, Darmstadt-Arheilgen, all of Fed. Rep. of Germany

[73] Assignee: Röhm GmbH, Darmstadt, Fed. Rep. of Germany

[21] Appl. No.: 221,321

[22] Filed: Jul. 19, 1988

[30] Foreign Application Priority Data

Jul. 29, 1987 [DE] Fed. Rep. of Germany ....... 3725058

[51] Int. Cl.⁴ .............................................. C08G 8/02
[52] U.S. Cl. ................................. 528/125; 528/126; 528/219; 525/390; 525/394; 525/416; 525/534
[58] Field of Search .................. 528/125, 126, 219; 525/390, 394, 416, 534

[56] References Cited

U.S. PATENT DOCUMENTS

| | | |
|---|---|---|
| 871,207 | 11/1886 | Hergenrother et al. . |
| 4,108,837 | 8/1978 | Johnson et al. ............. 528/126 |
| 4,175,175 | 11/1979 | Johnson et al. ............. 528/125 |
| 4,492,805 | 1/1985 | Besecke et al. ............. 568/12 |
| 4,696,993 | 9/1987 | Ude et al. ................... 528/167 |
| 4,745,225 | 5/1988 | Ude et al. ................... 568/15 |

FOREIGN PATENT DOCUMENTS

| | | |
|---|---|---|
| 3521123 | 12/1986 | Fed. Rep. of Germany . |
| 3521124 | 12/1986 | Fed. Rep. of Germany . |
| 3738339 | 5/1988 | Fed. Rep. of Germany . |

OTHER PUBLICATIONS

Hergenrother, Polymer J. vol. 19, (1987), 73–83, (only 78,79 enclosed).
Vinogradova et al., Polymer Science USSR vol. 14, (1972), 2962–2970).

*Primary Examiner*—John Kight
*Assistant Examiner*—S. A. Acquah
*Attorney, Agent, or Firm*—Curtis, Morris & Safford

[57] ABSTRACT

High-temperature-resistant, thermoplastically processable polyarylene ethers with repeating structural units of the general formula

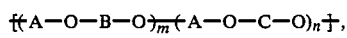

wherein
A represents 4,4′- or 4,4″-benzophenone units of the formula

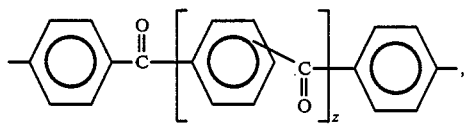

with z being 0 or 1,
B represents 9,9-bis(4′-phenyl)fluorene units of the formula

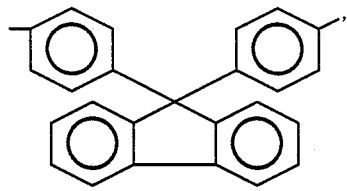

and
C represents 2,2-bis(4-phenyl)propane units of the formula

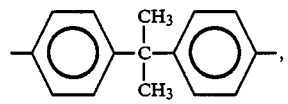

which are linked to one another in etherlike fashion through oxygen atoms, the composition of the polyarylene ethers being determined by m and n, the molar ratio of which ranges from 30:70 to 90:10, and wherein the sequence of the segments containing B or C may be random.

7 Claims, No Drawings

THERMOPLASTIC POLYARYLENE ETHERS

The present invention relates to difficultly flammable aromatic polyether resins capable of being thermoplastically processed and having a high glass transition temperature and a high decomposition temperature.

The prior art

Aromatic polyethers having the properties of plastics have long been part of the prior art and have gained economic importance as commercial products. Properties which the aromatic polyethers have in common and which are of advantage in many end uses are their softening temperature above 200° C. and their thermoplastic processability.

Apart from polyxylenol, which is also known as PPO and is made up of alternating aromatic and ether oxygen units in the polymer chain, the aromatic polyethers include polymers which in addition to the characteristic aromatic and oxygen units contain further characteristic groups of atoms, such as $$\underset{O}{\overset{O}{\underset{\|}{S}}}, \ \underset{O}{\overset{O}{\underset{\|}{S}}}, \ C, \ \underset{CH_3}{\overset{CH_3}{\underset{|}{C}}}$$

in the main chain.

Well known among these are the aromatic polyethersulfones, also known as polyarylsulfones, which are on the market as commercial products. (Ullmanns Enzyklopädie der technischen Chemie, 4th ed., vol. 15, pp. 429–435, and U.S. Pat. No. 4,175,175.)

Moreover, U.S. Pat. No. 4,492,805 describes aromatic polyethers with phosphorus-containing structural elements, such as triphenylphosphine oxide units, in the polymer chain which have proved themselves as difficultly flammable or nonflammable plastics.

Aromatic polyethers can generally be prepared by polycondensation of their structural units. For example, the phosphorus-containing polyarylene ethers of U.S. Pat. No. 4,492,805 are obtained by polycondensation of a difunctional phosphine or phosphine oxide, and particularly of the corresponding dihalogen compound, with a further difunctional aromatic compound, and especially a bis-hydroxy compound.

The chemical units used in the preparation of polyarylene ethers by polycondensation are preferably symmetrical compounds of type (I)

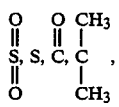 (I)

wherein R is $SO_2$, CO,

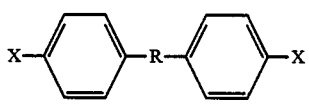

and X is F or Cl, and symmetrical compounds of type (II),

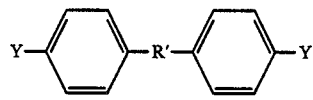 (II)

wherein R' is a covalent single bond, O, or

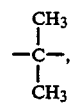

and Y is OH.

However, chemical units suitable for the preparation of aromatic polyethers also include compounds of types (I) and (II) wherein half or all of the reactive groups X and Y, respectively, are replaced by Y and X, respectively.

Polymer Science USSR, 14 (1972), 2962–2970, and Polymer Journal, vol. 19 (1987), pp. 78–79, describe aromatic polyethers of the "Cardo" type. These are prepared by polycondensation of type (I) dihalogen compounds wherein R is $SO_2$ or CO with type (II) bisphenols wherein R' is a cyclic organic group of which one carbon atom is the link between the two aromatic rings of the type (II) compounds. After the polycondensation, this quaternary carbon atoms forms part of the polymer main chain. Accordingly, examples of such bisphenols are phenolphthalein and phenolfluorene (9,9-bis(4'hydroxyphenyl)fluorene).

Phosphorus-containing polyarylene ethers which are built up like those of U.S. Pat. No. 4,492,805 but incorporate "Cardo" units are enumerated in published German patent applications P 35 21 123.7 (=U.S. Pat. No. 4,745,225) and P 35 21 124.5 (=U.S. Pat. No. 4,696,993).

Polyarylene ethers based on 9,9-bis(4'-hydroxyphenyl)-fluorene and obtained in the manner described in Polymer Journal, vol. 19 (1987), pp. 78–79, are distinguished by high thermal stability, as determined by way of the glass transition temperature of the polymers. The polyether, obtained by reaction of 4,4'-difluorobenzophenone with 9,9-bis(4'hydroxyphenyl)fluorene, has a glass transition temperature of 252° C. Tests run by the applicants on parts made from this polymer have shown that with values of about 10 percent for elongation at break, plastics from this polymer are relatively brittle materials.

In a fire, polyarylene ethers with units containing sulfone groups or nitrogen evolve toxic gases such as $SO_2$ or nitric oxide, or also HCN. A polyarylene ether whose structural units contain only C, H and O as elements will not give off such pollutants.

THE OBJECT AND THE INVENTION

It is apparent from the prior art that the known polyarylene ethers differ considerably from one another in their profile of properties. When they are used as plastics, their shortcomings show up along with their outstanding properties.

Thus there has been a need to develop plastics which are amorphous, thermoplastically processable, stable (including being resistant to hydrolysis), and tough, have relatively high thermal stability to about 200° C. and low water absorption, and in a fire release no toxic gases and exhibit very low smoke densities.

It has been found that polyarylene ethers containing ether-bridged
4,4'- or 4,4''-benzophenone units of the formula

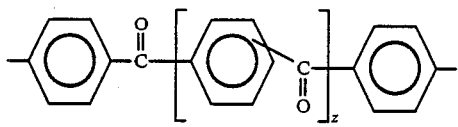 (A)

wherein z is 0 or 1,
9,9-bis(4'-phenyl)fluorene units of the formula

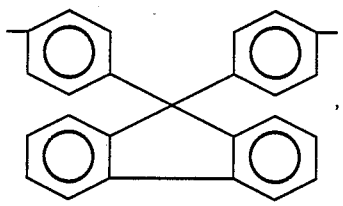 (B)

and
2,2-bis(4-phenyl)propane units of the formula

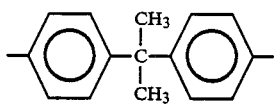 (C)

are plastics which do exhibit the desired profile of properties.

The polyarylene ethers of the invention can be represented by the repeating structural units of the general formula

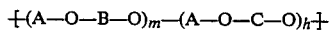

wherein A, B and C are the aforesaid units making up the polymer, linked in etherlike fashion through the O atom; the molar ratio of m to n ranges from 30:70 to 90:10, and preferably from 40:60 to 80:20, and most preferably from 50:50 to 70:30; and the distribution, that is, the sequence of the B- or C-containing structural units in the macromolecule, is unknown.

The inventive polyarylene ethers of the general formula (I) with molecular weights (determined as weight-average molecular weights by gel permeation chromatography) of over 20,000, and particularly those with a $M_w$ of over 30,000, can be thermoplastically processed into transparent, tough plastics. The new polymers are advantageously produced by polycondensation of the dihalogen derivatives of A, for example, 4,4'-difluorobenzophenone, with a mixture of the bisphenols 9,9-bis(4'-hydroxyphenyl)fluorene and 2,2-bis(4-hydroxyphenyl)propane (bisphenol A) in a molar ratio of the two bisphenols of from 0.4:0.6 to 0.6:0.4.

The invention thus relates to high-temperature-resistant, thermoplastically processable polyarylene ethers with repeating structural units of the general formula

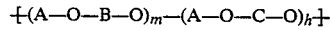

wherein
A represents 4,4'- or 4,4''-benzophenone units of the formula

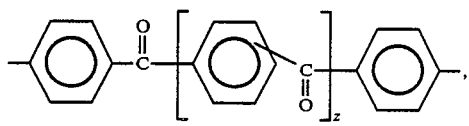

with z being 0 or 1,
B represents 9,9-bis(4'-phenyl)fluorene units of the formula

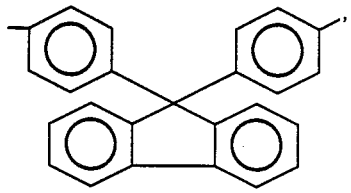

and
C represents 2,2-bis(4-phenyl)propane units of the formula

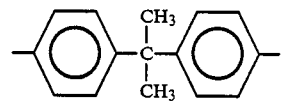

which are linked to one another in etherlike fashion through oxygen atoms, the composition of the polyarylene ethers being determined by m and n, the molar ratio of which ranges from 30:70 to 90:10, and preferably from 40:60 to 80:20, and most preferably from 50:50 to 70:30, and the sequence of the segments containing B or C being random or alternating.

The thermoplastically processable new polymers have weight-average molecular weights of over 20,000 and are produced by copolycondensation.

With the advent of these polymers, plastics are now available whose technically desirable properties are not fully matched by the high-temperature-resistant plastics known up to now. The copolymers of the invention have glass transition temperatures (measured by differential scanning calorimetry) ranging from 160° to 220° C. and, with elongations to break that are usually greater than 20 percent and moduli of elasticity of about 3,000 MPa, are viscoelastic materials which, moreover, attain a rating of at least V-1, and usually of V-0, in the UL94 flame-retardance classification; have bery low smoke densities; and in a fire evolve no toxic sulfur- or nitrogen-containing gases. Production parts obtained from these polymers (by thermoplastic processing, for example) are transparent and exhibit a water absorption of not more than 0.7 percent. (Saturation value on immersion in water at 23° C.) This low water absorption is a factor which contributes to the high dimensional stability of such production parts made from the new polymers. Because of the absence of groups that are particularly sensitive to hydrolysis, the new materials are also distinguished by good resistance to hydrolysis.

Prior-art specialty plastics, on the other hand, have, in addition to some excellent properties, less desirable characteristics, such as partial crystallinity and lack of transparency (PPO; "Noryl"; PPO blends; "PEEK"); too low a heat distortion temperature ($T_g$=155° C. for "Noryl"; 150° C. for "Makrolon"); or an inferior fire behavior (polysulfone and polyethersulfone giving toxic sulfurous gases; polyimides such as "Ultem" giving toxic nitrogenous gases). The new copolycondensates of the invention having ether-bridged A, B, and C units in the m:n ratio specified are materials with properties that are superior also to the known polycondensates having the formula —A—O—B—O—, which as mentioned earlier, make brittle plastics, and superior be isolated by distilling off the solvent and washing the residue with water; or precipitants such as water or ethanol may be added to the reaction mixture, the precipitated polymer then being filtered off and dried.

THE STARTING COMPOUNDS

The reactive starting compounds A' used to introduce the A units into the polycondensate (1) are:

4,4'-difluorobenzophenone, 4,4'-dichlorobenzophenone, 4-chloro- or 4-fluoro-4'-hydroxybenzophenone, and 4,4''-dichloroisophthalophenone or
4,4''-dichloroterephthalopheneone

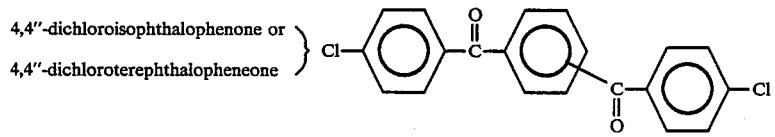

or the corresponding 4,4''-difluoro compounds.

also those with the composition —A—O—C—O—, which are polymers having a relatively low glass transition temperature (about 150° C.).

PRACTISE OF THE INVENTION

For preparing the new aromatic polyethers having the aromatic units A, B, and C by polycondensation, difunctional monomers A', B', and C' are used, which monomers differ from the units A, B, and C in having reactive functional groups on those sites later involved in the polycondensation reaction. The reactive compounds used are, in particular, compounds having halogen atoms, preferably fluorine and/or chlorine, and compounds having phenolic hydroxy groups, which are preferably reacted as a phenolate. In addition to dihalogen compounds and bisphenols as described earlier as type (I) compounds and type (II) compounds, suitable difunctional starting compounds are also those which have both a halogen group and a phenolic group in the same molecule. The compounds A', B', and C' are used in such a ratio to one another that the m:n ratio of the invention is obtained in the product and that the halogen and hydroxy groups, which react with one another, are equivalent. The inventive polycondensates will then have weight average molecular weights of over 20,000 and the properties of plastics.

In the preparation of the new polyarylene ethers, polycondensation conditions that are analogous to those described in U.S. Pat. No. 4,175,175 and to those which in U.S. Pat. No. 4,492,805 are described for the preparation of phosphorus-containing polyarylene ethers should be employed. This applies to the use of appropriate azeotrope formers, such as chlorobenzene or xylenes, and polar aprotic solvents, for example, dimethyl sulfoxide, sulfolane, N,N-dimethylformamide, N,N-dimethyl acetamide or N-methylpyrrolidone, and to the performance of the polycondensation at temperatures ranging from 100° to 300° C. in the presence of strongly basic alkali-metal compounds, for example, alkali-metal hydroxides such as sodium or potassium hydroxide, or in particular in the presence of sodium or potassium carbonate.

The reaction is carried out practically at normal pressure or at the pressure which comes to prevail in the reaction apparatus under the conditions of temperature. The formation of the inventive polymers under the conditions stated calls for reaction times ranging from 30 minutes to about 50 hours. The polycondensate can The functional halogen or hydroxy groups are preferably in the 4-positions. However, other position isomers may also be present in minor amounts in the starting compounds A'.

For introducing the B and C units, the phenolic compounds 9,9-bis(4'-hydroxyphenyl)fluorene and 2,2-bis(4'-hydroxyphenyl)propane (known as bisphenol A), are used as starting compounds B' and C'.

In the production of the new polymers, B' and C' are used in a molar ratio, m:n, of from 30:70 to 90:10, preferably from 40:60 to 80:20, and more preferably from 50:50 to 70:30.

However, as described in published German patent application P 35 21 123.7 (=U.S. Pat. No. 4,745,225) for polyarylene ethers containing phosphorus, the polyarylene ethers of the invention may optionally also have branched structures. Suitable additional starting compounds for the introduction of branching points into the polyethers of the invention are, for example, 1,3,5-tris(4'-hydroxyphenyl)benzene and 1,1,1-tris(4-hydroxyphenyl)-ethane.

A better understanding of the present invention and of its many advantages will be had from the following Examples, given by way of illustration.

EXAMPLE 1

Synthesis of a polyether from 4,4'-difluorobenzophenone (A'), 9,9-bis(4'-hydroxyphenyl)fluorene (B'), and bis-phenol A (C')

327.3 g (1.5 mols) of 4,4'-difluorobenzophenone (A'), 315.4 g (0.9 mol) of 9,9-bis(4'-hydroxyphenyl)fluorene (B'), 137.0 g (0.6 mol) of bisphenol A (C'), 218.4 g of potassium carbonate, 2.25 liters of N-methylpyrrolidone, and 1.35 liters of a technical xylene mixture were charged to a 6-liter four-necked flask equipped with stirrer, internal thermometer, nitrogen inlet, and a water separator with a reflux condenser set thereon. The reaction mixture was then heated to reflux temperature with an oil bath under a nitrogen atmosphere and the water formed was azeotroped off within 2 hours. After complete removal of the water, the xylene was distilled off at about 180° C. using the water separator and the residual reaction mixture was held at that temperature until the weight average molecular weight of the polycondensate was about 77,000 (as determined by gel permeation chromatography, standardized with polystyrene). Then, 0.2 mol of methyl chloride was passed through.

After cooling, the mixture was diluted with 500 ml of N-methylpyrrolidone and filtered by suction from the solid constituents of the reaction mixture. The polyether was then precipitated in seven times as much water/ethanol (volume ratio 7:3), separated from the liquid by filtration, and, after drying for 18 hours at room temperature, was dissolved in as little methylene chloride as possible. The solution was added dropwise to five times its volume of ethanol, with the polycondensate precipitating. The product was dried in a vacuum at 140° C. to constant weight. Yield: 597.3 g (83% of theory).

The analysis was performed using $H^1$ or $C^{13}$ NMR spectroscopy.

Production parts obtained by thermoplastic processing (extrusion) were found to have the following properties:

| $M_w$ | Elongation at break % | Modulus of elasticity[2] MPa | Tensile strength MPa | UL94 rating[3] | Smoke density[4] (1.5/4 min.) | Glass transition temp.[5] °C. | Water absorption[6] (23° C.) % |
|---|---|---|---|---|---|---|---|
| 87,700 | 52 | 3,100 | 83 | V-0 | ½ | 190 | 0.64 |

[1]GPC; standardization with polystyrene.
[2]DIN 53,455.
[3]Underwriters Laboratories test; V-0 is the best rating.
[4]Smoke chamber meeting the requirements of the National Bureau of Standards.
[5]Differential scanning calorimetry. (See E. A. Turi, ed., "Thermal Characterization of Polymeric Materials", p. 169, Academic Press, New York 1981).
[6]DIN 53,495.

EXAMPLES 2 AND 3

The reaction was carried out as described in Example 1, except that the molar ratio of bisphenol A to 9,9-bis(4'-hydroxyphenyl)fluorene was 5:5 and 3:7, respectively. Plastics having the following properties were then obtained:

| Example | Molar ratio | Elongation at break % | Modulus of elasticity MPa | Tensile strength MPa | UL94 rating | Smoke density (1.5/4 min.) | Glass transition temp. °C. | Water absorption (23° C.) % |
|---|---|---|---|---|---|---|---|---|
| 2 | 5:5 | 44 | 2,963 | 86 | V-1 | — | 185 | 0.56 |
| 3 | 3:7 | 42 | 3,079 | 86 | V-0 | 4/11 | — | — |

EXAMPLES 4, 5 AND 6

The reaction was carried out as described in Example 1, except that the 4,4'-difluorobenzophenone was replaced by 4,4'''-difluoroisophthalophenone(I) and/or 4,4'''-difluoroterephthalophenone(II) and that the bisphenol A and 9,9-bis(4'-hydroxyphenyl)fluorene were used in a molar ratio of 5:5.

Products having the following glass transition temperatures were obtained:

| Example | Activated dihalide | Glass transition temperature of polycondensate °C. |
|---|---|---|
| 4 | (I) | 202 |
| 5 | (II) | 185 |
| 6 | 50% each of (I) and (II) | 193 |

EXAMPLE 7

The reaction is carried out as described in Example 1 except that 4,4'''-difluoroisothalophenone, 4,4'''-difluoroterephthalophenone, 9,9'-bis(4'-hydroxyphenyl)fluorene, and bisphenol A are employed in a mol ratio of 5:5:6:4. A product having a glass transition temperature of 186° C. is obtained.

EXAMPLES 8, 9, AND 10

The reaction is carried out as in Example 1 with the difference that the mol ratios of 9,9'-bis(4'-hydroxyphenyl)-fluorene to bisphenol A are respectively, 8:2; 9:1; and 3:7. Synthetic resins having the properties reported in the following Table are obtained.

| Ex. No. | Elong'n at break (%) | Mod. elasticity (MPa) | Tensile strength (MPa) | UL 94 rating | Smoke density (1.5/4 min) | Glass trans'n T(°C.) | Water absp'n (23° C.) |
|---|---|---|---|---|---|---|---|
| 8 | 15 | 3108 | 97 | V-0 | 1/1 | 215 | 0.67 |
| 9 | 8 | 2990 | 91 | V-0 | 1/1 | 226 | — |
| 10 | 66 | 2850 | 76.5 | V-1 | ½ | 178 | — |

EXAMPLES 11, 12, AND 13

The reaction was carried out as in Examples 4–6 using various mixtures of (a) 4,4'''-difluoroterephthalophenone and (b) 4,4'-difluorobenzophenone which were reacted as dihalides. The glass transition temperatures of the products are reported below.

| Ex. No. | Mol Ratio a:b | Glass Transition Temp. (°C.) |
|---|---|---|
| 11 | 3:1 | 196 |
| 12 | 2:2 | 197 |

-continued

| Ex. No. | Mol Ratio a:b | Glass Transition Temp. (°C.) |
|---|---|---|
| 13 | 1:3 | 200 |

In compounds of this type, the molar ratio of compounds of the type (a) to compounds of type (b) can range from 99.0:0.1 to 0.1:99.9.

What is claimed is:

1. A polyarylene ether having therein repeating structural units of the formulas (—A—O—B—O—) and (—A—O—C—O—), wherein A is 4,4'-benzophenone of the formula

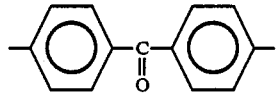

or a mixture of 4,4'-benzophenone and a 4,4''-benzophenone of the formula

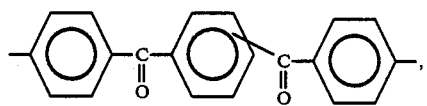

B is 9,9-bis-(4'-phenyl)fluorene of the formula

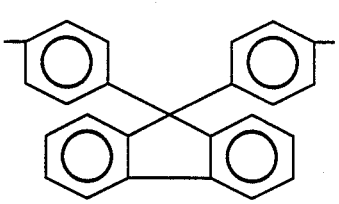

C is 2,2-bis(4-phenyl)propane of the formula

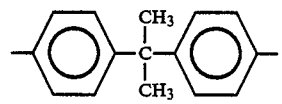

the molar ratio of units (A—O—B—O) to (A—O—C—O) is from 30:70 to 90:10.

2. A polyarylene ether as in claim 1 wherein the molar ratio of units (A—O—B—O) to (A—O—C—O) is from 40:60 to 80:20.

3. A polyarylene ether as in claim 1 wherein the molar ratio of units (A—O—B—O) to (A—O—C—O) is from 50:50 to 70:30.

4. A polyarylene ether as in claim 1 containing only 4,4'-benzophenone as A.

5. A polyarylene ether as in claim 1 containing both 4,4'-benzophenone and said 4,4''-benzophenone as A.

6. A polyarylene ether as in claim 5 wherein the molar ratio of 4,4'-benzophenone to said 4,4''-benzophenone in A is from 99.9:0.1 to 0.1:99.9.

7. A polyarylene ether as in claim 5 wherein the molar ratio of 4,4'-benzophenone to said 4,4''-benzophenone in A is from 3:1 to 1:3.

* * * * *